United States Patent
Elliott

(10) Patent No.: US 8,630,423 B1
(45) Date of Patent: Jan. 14, 2014

(54) SYSTEM AND METHOD FOR TESTING THE SPEAKER AND MICROPHONE OF A COMMUNICATION DEVICE

(75) Inventor: Brig Barnum Elliott, Arlington, MA (US)

(73) Assignees: Verizon Corporate Service Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 3029 days.

(21) Appl. No.: 09/588,057

(22) Filed: Jun. 5, 2000

(51) Int. Cl.
*H04R 29/00* (2006.01)

(52) U.S. Cl.
USPC .......................................................... 381/58

(58) Field of Classification Search
USPC ................ 381/58–59, 96, 60, 77, 312, 93, 6; 379/27.01, 67.1
See application file for complete search history.

(56) References Cited

U.S. PATENT DOCUMENTS

| | | | | |
|---|---|---|---|---|
| 3,261,926 A * | 7/1966 | Bryant et al. | ............... | 379/27.01 |
| 4,575,587 A * | 3/1986 | Stokes et al. | ............... | 379/27.01 |
| 4,788,708 A * | 11/1988 | Hendrix | ...................... | 379/22.02 |
| 4,815,122 A * | 3/1989 | Shefler | ......................... | 379/88.27 |
| 4,903,323 A * | 2/1990 | Hendershot | .................... | 455/67.7 |
| 5,020,135 A | 5/1991 | Kasparian et al. | ............... | 455/76 |
| 5,396,544 A * | 3/1995 | Gilbert et al. | ............... | 379/88.23 |
| 5,400,406 A * | 3/1995 | Heline et al. | ..................... | 381/58 |
| 5,450,624 A | 9/1995 | Porambo et al. | ........... | 455/226.4 |
| 5,581,621 A * | 12/1996 | Koyama et al. | ................ | 381/103 |
| 5,681,108 A * | 10/1997 | Miller | ............................. | 700/92 |
| 5,875,397 A | 2/1999 | Sasin et al. | ..................... | 455/423 |
| 6,035,046 A * | 3/2000 | Cheng et al. | .................... | 381/59 |
| 6,232,785 B1 * | 5/2001 | Kelsey | ........................... | 324/527 |
| 6,266,571 B1 * | 7/2001 | Fado et al. | ...................... | 700/94 |
| 6,760,451 B1 * | 7/2004 | Craven et al. | .................. | 381/98 |
| 6,766,025 B1 * | 7/2004 | Levy et al. | ...................... | 381/96 |

* cited by examiner

*Primary Examiner* — Lun-See Lao

(57) ABSTRACT

A method for testing a speaker (212) and microphone (216) of a communication device (110) is provided. The method includes playing a first audio signal through the speaker (212) and determining whether the first audio signal is audible. If the first audio signal is audible, the communication device (110) receives a second audio signal through its microphone (216) and plays the second audio signal through the speaker (212). If the second audio signal is audible the method determines that the microphone (216) is properly functioning. Such a method allows the communication device (110) to be quickly and easily tested.

15 Claims, 4 Drawing Sheets

SYSTEM AND METHOD FOR TESTING THE SPEAKER AND MICROPHONE OF A COMMUNICATION DEVICE

FIELD OF THE INVENTION

The present invention relates generally to communication devices and, more particularly, to a system and method for testing the microphone and speaker of a communication device.

BACKGROUND OF THE INVENTION

Over the past decade, wireless communication devices, such as walkie-talkies, cellular telephones, and the like, have become increasingly more complex. A current trend in the field is to implement these wireless communication devices as "software radios." These software radios contain small, but often complete computer systems for processing voice communications.

As these wireless communication devices become more complex, testing of these devices becomes more difficult. For example, in order to test the proper operation of a cellular telephone, the user may be forced to place a call to another telephone in order to determine whether the speaker and microphone are working. In the event that one of the two parties cannot hear the other party, a number of factors, besides an improper working microphone or speaker, may be the culprit. For example, the cellular telephone user may be in a bad cell. Often times, the only way to be certain that the speaker or microphone is working improperly is to actually take the wireless communication device apart. This type of technique, of course, requires special skill.

There exists a need for a system and method that quickly and easily determines whether the speaker and microphone of a communication device are operating properly.

SUMMARY OF THE INVENTION

Systems and methods consistent with the present invention address this need by providing a process in which the speaker and microphone of a communication device may be quickly and easily tested.

In accordance with the purpose of the invention as embodied and broadly described herein, a method for testing the speaker and microphone of a communication device includes playing a first audio signal through the speaker; determining whether the first audio signal is audible; receiving, when the first audio signal is audible, a second audio signal through the microphone; playing, in response to the receiving, the second audio signal through the speaker; determining whether the second audio signal is audible; and determining that the speaker and microphone are functioning properly when the second audio signal is audible.

In another implementation consistent with the present invention, a method for testing a speaker of a communication device includes receiving an indication that the speaker is to be tested, playing a pre-recorded sound clip through the speaker, and determining that the speaker is operating properly when the pre-recorded sound clip is audible.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a communication device that can be quickly and easily tested. When a user indicates that the speaker and microphone of the communication device are to be tested, the communication device automatically tests the proper operation of the speaker by playing a pre-recorded sound clip. If the sound clip is audible, then the speaker is operating properly. The user may then test the microphone by speaking into it. The communication device plays the user's sound clip through the speakers. If the user's sound clip is audible, then the microphone is determined to be operating properly.

Exemplary System

Figure 1:
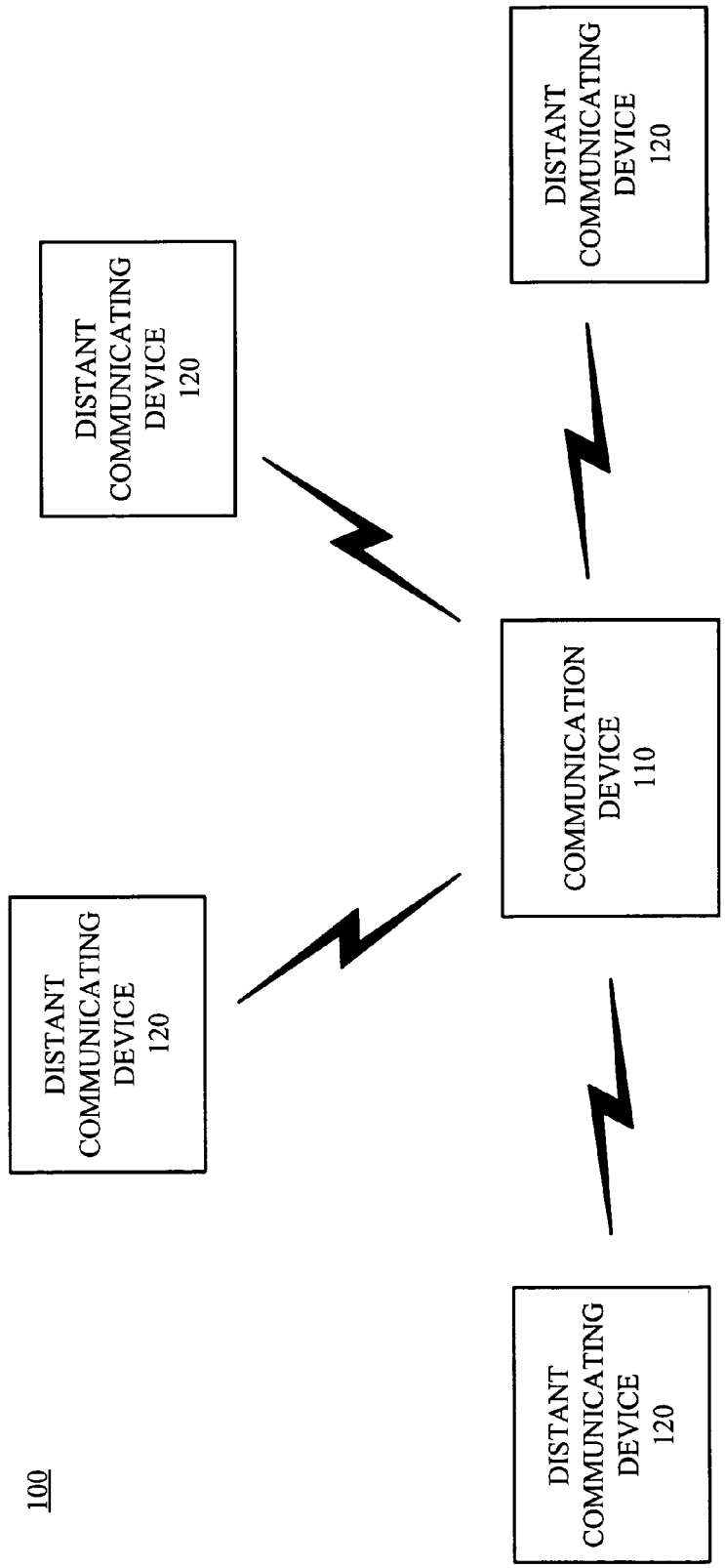
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, the exemplary system 100 includes a communication device 110 and a group of distant communicating devices 120. It will be appreciated that a typical system could include more or less devices than are shown in FIG. 1.

The communication device 110 may include one or more software radio devices (i.e., radio devices having processing capabilities). The communication device 110 may include a walkie-talkie, a cellular telephone, a voice over Internet protocol (VoIP) telephone, a personal or portable computer, a personal digital assistant (PDA), and the like. The communication device 110 may transmit and receive information to/from distant devices 120 via any conventional wireless technique.

The distant communicating devices 120 may be constructed in a similar manner to the communication device 110. The distant communicating devices 120 may transmit and receive information to/from communication device 110 or other distant communicating devices 120.

Exemplary Communication Device

Figure 2:
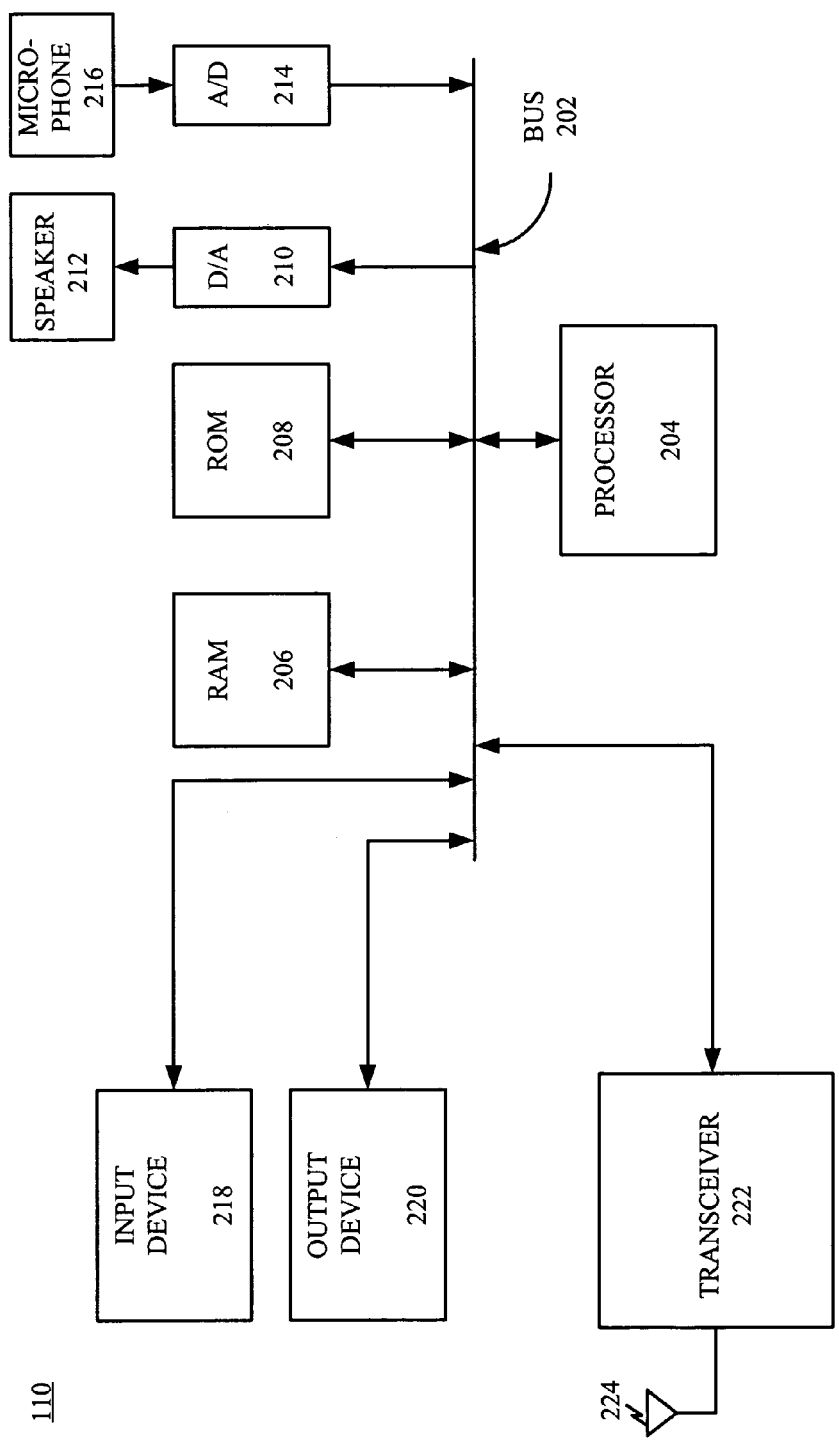
FIG. 2 illustrates an exemplary communication device consistent with the present invention.

FIG. 2 illustrates an exemplary communication device 110 consistent with the present invention. In FIG. 2, the communication device 110 includes a bus 202, a processor 204, a Random Access Memory (RAM) 206, a Read Only Memory (ROM) 208, a digital-to-analog (D/A) converter 210, a speaker 212, an analog-to-digital (A/D) converter 214, a microphone 216, an input device 218, an output device 220, a transceiver 222, and an antenna 224. The communication device 110 may include one or more additional components, such as an encryption device (not illustrated), that are common to wireless communications.

The bus 202 interconnects the various components of the communication device 110 to permit the components to communicate with one another. The processor 204 may include any type of conventional processing device that interprets and executes instructions. RAM 206 may include a conventional RAM or a similar dynamic storage device that stores information and instructions to be executed by processor 204. RAM 206 may also store temporary variables or other intermediate information used during execution of instructions by processor 204. ROM 208 may include a conventional ROM or other type of static storage device that stores static information and instructions for processor 204. RAM 206 and ROM 208 may also include large-capacity storage devices, such as a magnetic and/or optical recording medium and its corresponding drive.

Digital-to-analog (D/A) converter 210 includes conventional circuitry for converting digital audio signals from a digital form to an analog form. Speaker 212 includes one or more conventional mechanisms for providing an audible output of the D/A converted audio signals. Analog-to-digital (A/D) converter 214 includes conventional circuitry for converting analog audio input signals from microphone 216 to digital signal form. Microphone 216 includes one or more conventional mechanisms for converting an audible input into analog signals.

The input device 218 includes one or more devices that allow the operator to interact with the communication device 110. The input device 218 may include, for example, buttons, switches, dials, knobs, a keyboard, a mouse, a pen, a keypad, voice recognition and/or biometric mechanisms, and the like. The output device 220 includes one or more devices for providing information to an operator. The output device 220 may include, for example, a display.

Transceiver 222 may include any type of conventional transceiver circuitry that transmits and receives information in a wireless environment. Antenna 224 may include a conventional antenna that facilitates reception and transmission of information by transceiver 222.

As will be described in detail below, implementations consistent with the present invention allow for testing of the communication device 110 to be quickly and easily performed. The communication device 110 performs the functions necessary for testing the proper functioning of the speaker 212 and microphone 216 in response to processor 204 executing sequences of instructions contained in, for example, RAM 206. Such instructions may be read into RAM 206 from another computer-readable medium, such as a storage device, or from another device via transceiver 222. Execution of the sequences of instructions contained in RAM 206 causes processor 204 to perform a method that will be described hereafter. Alternatively, hard-wired circuitry may be used in place of or in combination with software instructions to implement the present invention. Thus, the present invention is not limited to any specific combination of hardware circuitry and software.

Exemplary Process

Figure 3A:
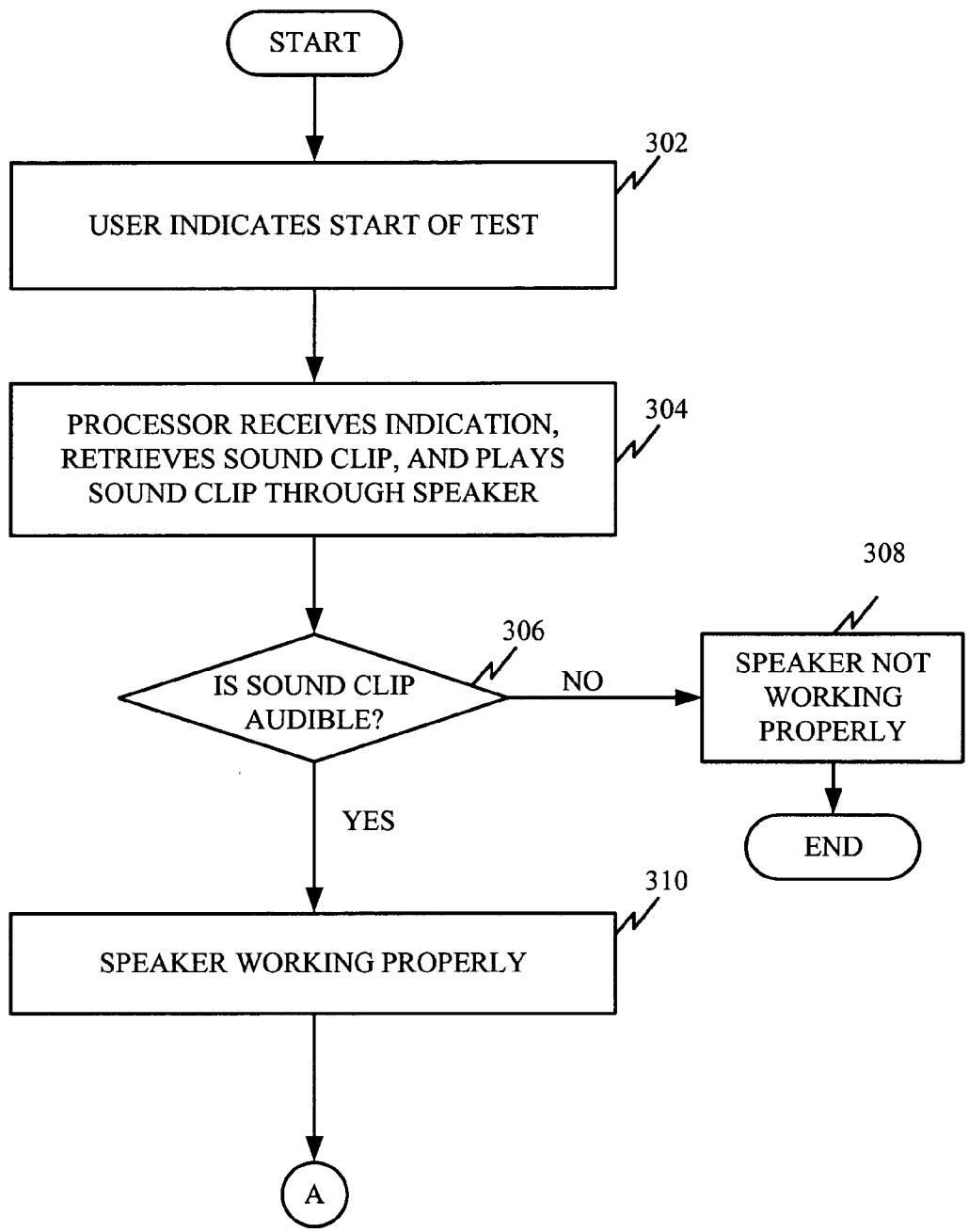
FIGS. 3A and 3B illustrate an exemplary process, consistent with the present invention, for testing the speaker and microphone of a communication device.
Figure 3B:
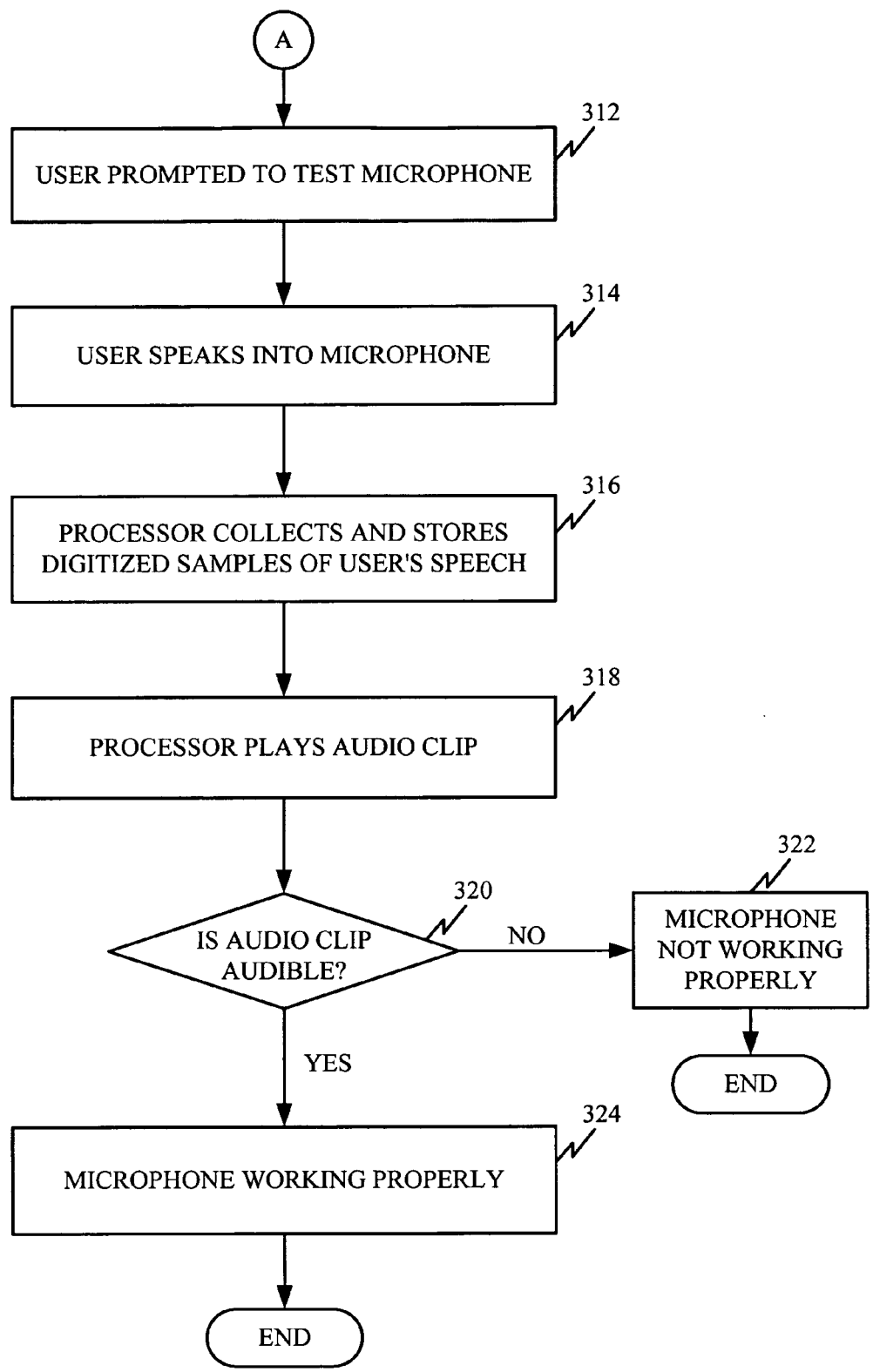

FIGS. 3A and 3B illustrate an exemplary process, consistent with the present invention, for testing the speaker 212 and microphone 216 of a communication device, such as communication device 110 of FIG. 2. The process begins with a user indicating a desire to test the communication device's 110 speaker 212 and microphone 216 [step 302, FIG. 3A]. This indication may be made via the input device 218, for example, by pushing a button, setting a toggle, typing or keying an indication using a keyboard or keypad, announcing the indication when voice recognition capabilities are present, etc. In an alternative implementation, the testing may be performed automatically when power is applied to the communication device 110.

The processor 204 receives the indication that the user desires to test the communication device's 110 speaker 212 and microphone 216 [step 304]. In response thereto, the processor 204 retrieves a pre-recorded sound clip from ROM 208 [step 304]. The sound clip may be stored in ROM 208 at the factory, during a logistics installation, etc. Since the sound clip is stored in ROM 208, it may not be adjusted by the user. The processor 204 then causes, through the use of D/A converter 210, the sound clip to be played through the speaker 212 [step 304].

The user then determines whether the sound clip is audible [step 306]. If the sound clip is inaudible, then the speaker 212 is determined to be working improperly (e.g., the speaker 212 may be broken or disconnected) [step 308]. In implementations consistent with the present invention, the sound clip may contain, for example, a range of frequencies so that a more detailed analysis may be made. For instance, it may be determined that the speaker 212 is capable of producing low-frequency sounds but can no longer produce high-frequency sounds.

If, on the other hand, the pre-recorded sound clip is audible through the communication device's 110 speaker 212, then the speaker 212 is determined to be working properly [step 310]. The communication device 110 then prompts the user to test the microphone 216 [step 312, FIG. 3B]. The communication device 110 may prompt the user in a number of ways. For example, the processor 204 may cause a text message to be displayed on the communication device's 110 output device 220. Alternatively, the pre-recorded sound clip may end with an audio message to the user asking him or her to perform the microphone test.

The user then speaks into the microphone 216 [step 314]. The processor 204 collects digitized samples of the user's speech from the A/D converter 214 and temporarily stores the resulting audio clip in RAM 206 [step 316]. Once the user stops speaking, the processor 204 then causes, through the use of the D/A converter 210, the user's audio clip to be played through the speaker 212 [step 318].

The user determines whether the audio clip is audible [step 320]. If the audio clip is inaudible, the microphone 216 is determined to be working improperly (i.e., the microphone 216 may be, for example, broken or disconnected) [step 322]. If, on the other hand, the audio clip is audible, then the microphone 216 is determined to be working properly [step 324].

Implementations consistent with the present invention provide a highly convenient way for a user of a software radio device to quickly test the radio's speaker and microphone. This invention has both military and commercial uses. For example, a process consistent with the present invention allows typical users to quickly check and diagnose common problems with radio speakers and microphones. This is advantageous because the test can be performed very quickly, and without any skilled personnel or extra test equipment. In addition, this test can be performed by a solitary individual without requiring another party, and does not require any over-the-air transmissions.

CONCLUSION

Systems and methods consistent with the present invention provide a communication device that can be quickly and easily tested. When a user indicates that the speaker and microphone of the communication device are to be tested, the communication device automatically plays a pre-recorded sound clip through its speaker. If the sound clip is audible, the speaker is determined to be working properly. The user then tests the microphone by speaking into it. The communication device plays the user's sound clip through the speakers. If this sound clip is audible, then the microphone is determined to be working properly. Such a technique allows for the speaker and microphone of the communication device to be tested without requiring special skill or over-the-air transmissions.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps has been presented with respect to FIGS. 3A and 3B, the order of the steps may be altered in other implementations consistent with the present invention.

The scope of the invention is defined by the following claims and their equivalents.

What is claimed is:

1. A method for testing a speaker and a microphone of a communication device, the method comprising:
   receiving an indication from a user of the communication device that the speaker of the device and the microphone of the device are to be tested;
   in response to receiving the indication that the speaker and microphone of the device are to be tested, playing a pre-recorded sound clip through the speaker;
   upon receiving an indication from the user that the pre-recorded sound clip is audible, prompting the user to speak into the microphone;
   receiving, in response to receiving the indication that the pre-recorded sound clip is audible, a second audio signal from the user speaking into the microphone;
   playing, in response to receiving the second audio signal, the second audio signal through the speaker;
   receiving, in response to playing the second audio signal through the speaker, an indication that the second audio signal played through the speaker is audible to the user; and
   determining that the speaker and the microphone are operating properly when the pre-recorded sound clip and the second audio signal are audible to the user.

2. The method of claim 1 wherein the pre-recorded sound clip contains a range of human-distinguishable frequencies.

3. The method of claim 1, further comprising including a high frequency sound and a low frequency sound in the pre-recorded sound clip to test a frequency-reproducing capability of the speaker to produce sounds of different frequencies, wherein the indication from the user that the pre-recorded sound clip is audible includes first information indicative of whether the high frequency sound is audible and second information indicative of whether the low frequency sound is audible, thereby allowing a detailed analysis of the frequency-reproducing capability of the speaker to be made.

4. The method of claim 1, further comprising storing the pre-recorded sound clip on a read-only memory of the communication device such that the pre-recorded sound clip cannot be changed by the user.

5. The method of claim 4, further comprising storing the pre-recorded sound clip on the read-only memory of the communication device during one of manufacture of the communication device and after manufacture upon installation of the communication device.

6. A communication device, comprising:
   a non-transitory memory configured to store instructions; and
   a processor configured to execute the instructions to perform operations including:
      receiving an indication from a user of a communication device that a speaker of the device and a microphone of the device are to be tested;
      in response to receiving the indication that the speaker and microphone of the device are to be tested, playing a pre-recorded sound clip through the speaker;
      upon receiving an indication from the user that the pre-recorded sound clip is audible, prompting the user to speak into the microphone;
      receiving, in response to receiving the indication that the pre-recorded sound clip is audible, a second audio signal from the user speaking into the microphone;
      playing, in response to receiving the second audio signal, the second audio signal through the speaker;
      receiving, in response to playing the second audio signal through the speaker, an indication that the second audio signal played through the speaker is audible to the user; and
      determining that the speaker and the microphone are operating properly when the pre-recorded sound clip and the second audio signal are audible to the user.

7. The communication device of claim 6, wherein the pre-recorded sound clip contains a range of human-distinguishable frequencies.

8. The communication device of claim 6, the processor configured to execute the instructions to perform operations further comprising providing the communication device having the speaker and the microphone to the user.

9. The communication device of claim 6, the processor configured to execute the instructions to perform operations further comprising including a high frequency sound and a low frequency sound in the pre-recorded sound clip to test a frequency-reproducing capability of the speaker to produce sounds of different frequencies, wherein the indication from the user that the pre-recorded sound clip is audible includes first information indicative of whether the high frequency sound is audible and second information indicative of whether the low frequency sound is audible, thereby allowing a detailed analysis of the frequency-reproducing capability of the speaker to be made.

10. The communication device of claim 6, further comprising a read-only memory on which the pre-recorded sound clip is stored, such that the pre-recorded sound clip cannot be changed by the user.

11. The communication device of claim 10, wherein the pre-recorded sound clip is stored on the read-only memory of the communication device during one of manufacture of the communication device and after manufacture upon installation of the communication device.

12. A non-transitory computer-readable medium containing instructions for controlling at least one processor to perform operations comprising:
   receiving an indication from a user of a communication device that a speaker of the device and a microphone of the device are to be tested;
   in response to receiving the indication that the speaker and microphone of the device are to be tested, playing a pre-recorded sound clip through the speaker;
   upon receiving an indication from the user that the pre-recorded sound clip is audible, prompting the user to speak into the microphone;

receiving, in response to receiving the indication that the pre-recorded sound clip is audible, a second audio signal from the user speaking into the microphone;

playing, in response to receiving the second audio signal, the second audio signal through the speaker;

receiving, in response to playing the second audio signal through the speaker, an indication that the second audio signal played through the speaker is audible to the user; and determining that the speaker and the microphone are operating properly when the pre-recorded sound clip and the second audio signal are audible to the user.

13. The non-transitory computer-readable medium of claim 12, wherein the pre-recorded sound clip contains a range of human-distinguishable frequencies.

14. The non-transitory computer-readable medium of claim 12, further containing instructions for controlling at least one processor to perform operations comprising including a high frequency sound and a low frequency sound in the pre-recorded sound clip to test a frequency-reproducing capability of the speaker to produce sounds of different frequencies, wherein the indication from the user that the pre-recorded sound clip is audible includes first information indicative of whether the high frequency sound is audible and second information indicative of whether the low frequency sound is audible, thereby allowing a detailed analysis of the frequency-reproducing capability of the speaker to be made.

15. The non-transitory computer-readable medium of claim 12, further containing instructions for controlling at least one processor to perform operations comprising retrieving the pre-recorded sound clip from a read-only memory of the communication device such that the pre-recorded sound clip cannot be changed by the user.

* * * * *